United States Patent Office 3,438,004
Patented Apr. 8, 1969

3,438,004
TIME SELECTORS, ANALYSERS OR RECORDERS, FOR ELECTRICAL PULSES WHICH MAY FOLLOW ONE ANOTHER AT VERY SHORT INTERVALS
Edouard Laviron, Montgeron, France, assignor to Commissariat a l'Energie Atomique, Paris, France, an organization of France
Filed Aug. 23, 1966, Ser. No. 574,328
Claims priority, application France, Sept. 1, 1965, 30,118
Int. Cl. G11b *13/00*
U.S. Cl. 340—172.5    8 Claims

ABSTRACT OF THE DISCLOSURE

Time selectors, analysers or recorders adapted to receive and classify, according to their successive arrival times, pulses which may follow one another at very short intervals comprising a shaping unit which converts each incoming pulse to an electrical square wave, at least two delay lines, a distribution unit having one input connected to the output of the shaping unit to receive the electrical square waves, and at least two outputs connected each to the input of one of the delay lines and delivering the received square waves cyclically to each delay line during the delay time thereof. The apparatus includes sampling means for detecting the state of each of the delay lines at predetermined intervals which includes storage elements adapted to store the different states of the sampled delay lines. Comparator elements are provided for comparing two successive storage elements and delivering a pulse presence signal whenever the first storage element of two successive storage elements stores a state corresponding to the existence of a square wave at the corresponding sampling time, and which has been immediately preceded by an even number of elements storing such a state. The apparatus also includes a buffer store having a plurality of recording points, and transfer means adapted to transfer the storage element contents, thus compared to the store. A distribution unit is adapted to distribute the outputs of the transfer means to the successive groups of recording points of the store. A control unit is provided to control first, the distribution unit, the sampling means, the storage elements and the transfer means, and secondly, the distribution unit to apply the transfer means outputs to a new group of points of the buffer store on each delay line cycle.

---

This invention relates to apparatus for the recording of electrical pulses, that is, time selectors, analysers or recorders adapted to receive and classify, according to their successive arrival times, pulses which may follow one another at very short intervals; it relates more particularly, but not exclusively, to a buffer store for the storage of bursts of electrical pulses which follow one another at times of up to ten nanoseconds (one nanosecond, abbreviated 1 ns., is equal to $10^{-9}$ second).

An object of the invention is to provide an improved pulse selector, analyser or recorder having regard to practical requirements, more particularly as regards reliability and selectivity of handling successive pulses spaced an interval greater than 10 ns.

According to one aspect of the invention, a recorder, selector or analyser for handling and classifying electrical pulses spaced by an interval of time greater than an interval $i$, comprises is provided with in combination:

A shaping unit which converts each incoming pulse to an electrical square wave of a width between $i/2$ and $i$;

At least two delay lines;

A distribution unit having one input connected to the output of the shaping unit to receive the electrical square waves therefrom and at least two outputs connected each to the input of one of the delay lines and delivering the received square waves cyclically to each delay line during the delay time thereof;

Sampling means for detecting the state of each of the delay lines at intervals equal substantially to $i/2$;

Storage elements connected to the said sampling means and adapted to store the different states of the thus sampled delay lines;

Comparator elements for comparing two successive storage elements and delivering a pulse presence signal whenever the first storage element of two successive storage elements stores a state corresponding to the existence of a square wave at the corresponding sampling time and is immediately preceded by an even number (possibly zero) of elements storing such a state;

A buffer store having a plurality of recording points, the successive points of said store corresponding to successive intervals of time quantised by the quantum $i$;

Transfer means adapted to transfer the storage element contents thus compared to the said store;

A distribution unit adapted to distribute the outputs of the transfer means to the successive groups of recording points of the said store; and A control, unit adapted to control first the distribution unit, the sampling means, the storage elements and the transfer means so that for each delay line the following operations are obtained cyclically in succession: application of square waves to said delay line, sampling of said delay line by the said sampling means, storage in the storage elements associated with said delay line, transfer by the transfer means to the buffer store and rezeroing of the storage elements associated with said delay line and, secondly, the said distribution unit to apply the transfer means outputs to a new group of points of the buffer store on each delay line cycle.

The invention includes some other features which are preferably used at the same time, but which, could if required, be used separately and which will be discussed in greater detail hereinafter.

According to a further feature a reading device is provided for a buffer store, such reading device comprising recording points distributed as a matrix in lines and columns, said device allowing reading of the successively recorded points line-by-line and comprising in combination:

Means adapted to interrogate the points of a line simultaneously;

A column reading unit adapted to transfer a reading pulse if the point of the said column belonging to the interrogated line has undergone a recording;

A column storage element to store any output pulse from the reading unit for the said column;

Gates for transferring the contents of the said storage elements;

A mixer for the transfer gate outputs;

A register;

A clock adapted to apply pulses at a regular rate to the said register and cyclically to the said gates to render them operative;

A control unit which after having been triggered is adapted to control the starting of the clock and the cyclic actuation of the line-by-line interrogation means and provide transfer of the contents of the said storage elements by the said gates; and Control means which in response to the supply from the mixer outut are adapted to stop the clock and control the recording in a channel selector of the number recorded in the register at the time when the clock stops.

The invention has particular application to a recorder for connection to the output of a particle detector of the scintillator and photomultiplier type disposed at the downstream end of a time-of-flight base fed by burst of particles issuing from a particle accelerator.

The invention will be more readily understood from the following description and appended drawings given by way of example;

The main object of the invention as embodied in the recorder apparatus to be described is to permit a burst of pulses which follow one another very closely to be recorded with an accuracy for example, of the order of 10 ns. and with an idle time of 10 ns.

Selectors are known with which a pulse can be obtained every 100 or 150 ns., and after the arrival of a first pulse such selectors can react to a subsequent pulse only if it occurs at least 100 or 150 ns. after the first pulse. In other words, these selectors have an idle time of 100 to 150 ns. during which they are insensitive to any new pulse.

The invention allows pulses separated by a smaller time interval to be recorded, the idle time being reduced to about 10 ns. Thus all the information in bursts of pulses separated by at least 10 ns. can be collected, said bursts recurring at a low frequency of the order of 50 to 150 c./s.

The recorder apparatus is, to some extent, a time expander by means of which all the pulses can be recorded in a buffer store during the time of each pulse burst, and the contents of the store can be delivered to a selector at a slower rate.

In the foregoing manner the contents of the buffer store can be delivered to a store or selector unit comprising a plurality of channels, for example 1024 or 4096 channels.

By way of example, a particle accelerator may be used which pulsates at the maximum repetition frequency of 150 particle bursts per second. A scintillator—photomultiplier system receives the particles downstream of a time-of-flight base and delivers a series of pulses for each particle burst. The problem is to record the distribution of the particles, that is, of the electrical pulses from the scintillator-photomultiplier system, in time.

Figure 1:
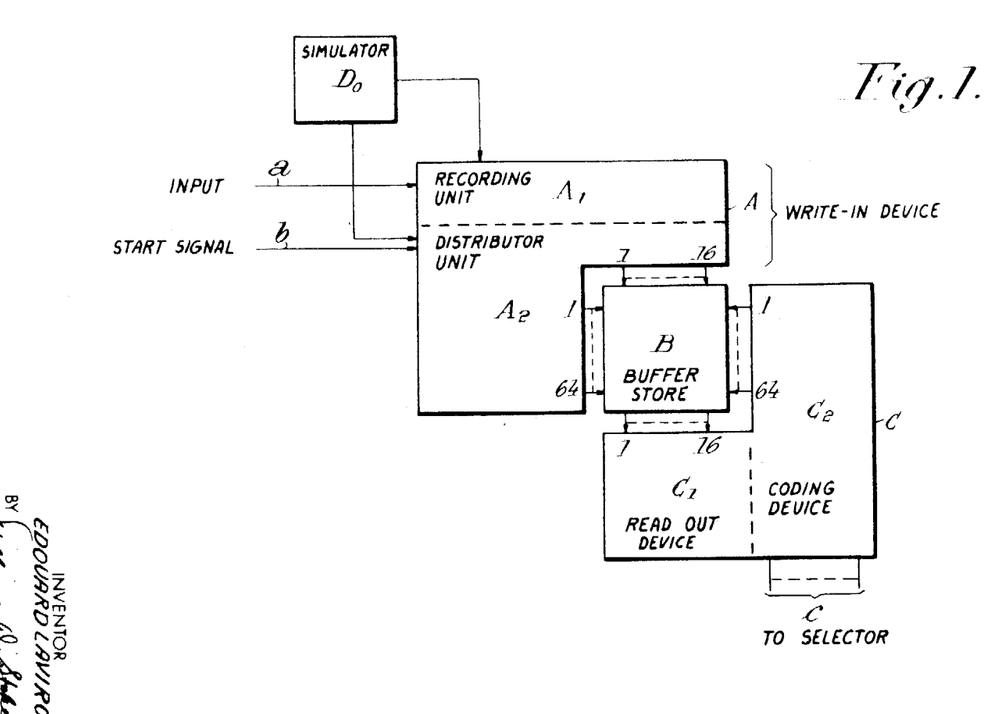
FIGURE 1 is a block diagram of an electrical pulse recorder apparatus provided with the improvements according to the invention.

A complete recorder for such an application is shown in FIGURE 1 and comprises an input $a$ connected to the output of the photomultiplier (not shown) and an input $b$ connected to a start signal gate (not shown).

The apparatus includes:

A write-in or record device A consisting of an actual recording unit $A_1$ and a distributor unit $A_2$ for distributing the pulses; a buffer store B which advantageously consists of a magnetic thin film or sheet having a number of recording points (more particularly 1024 or 4096) distributed in the form of a matrix by lines and columns; and a read-out device C consisting of an actual read-out device $C_1$ and a coding device $C_2$ which distributes the read pulses to a relatively slow selector which, for example, has 1024 or 4096 channels, and which is connected at $c$ and is not shown.

The system shown in FIGURE 1 also includes a simulator $D_0$ applying control pulses to the two units $A_1$ and $A_2$ of the write-in or record device A for checking correct operation of the apparatus.

Figure 2:
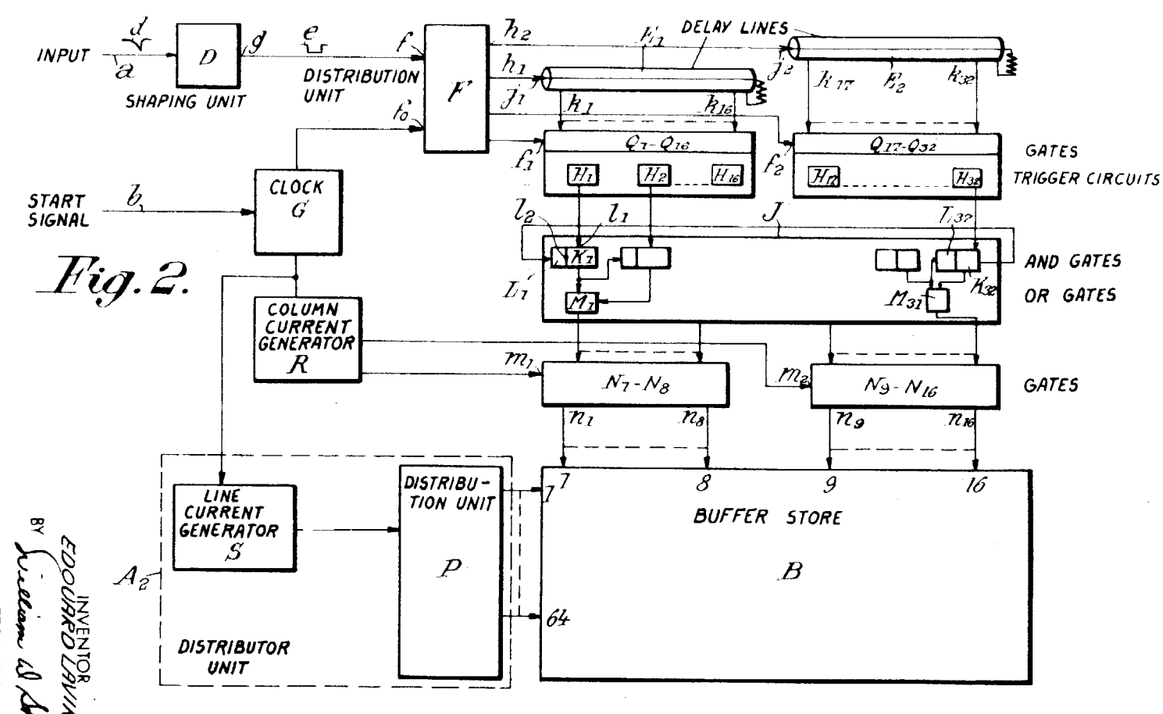
FIGURE 2 shows the various components of the recording part of the buffer store of the recorder apparatus shown in FIGURE 1.

FIGURE 2 shows the units $A_1$ and $A_2$ of the write-in or record device A of FIGURE 1 in more detail.

The record device A is illustrated for a situation where the time interval $i$, between two successive pulses which it is required to distinguish is equal to 10 ns., and wherein two delay lines are provided.

The recording unit $A_1$ comprises a shaping unit D connected to the input $a$ for converting each incoming pulse $d$ (from the photomultiplier connected to the point $a$ and hence corresponding to a particle) into an electrical square wave $e$ of a width ranging between 5 ns. and 10 ns.

Figure 3:
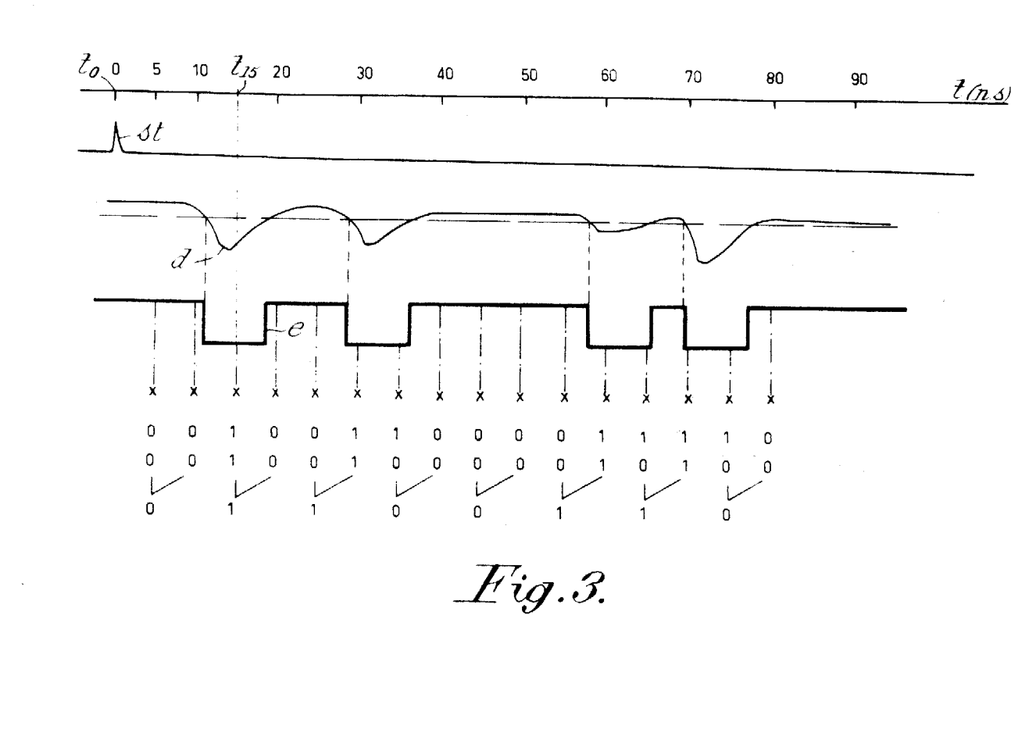
FIGURES 3 and 4 illustrate electrical signals fed to the recorder according to FIGURE 2.

In FIGURE 3, reference $d$ denotes the incoming pulses and $e$ the shaped square waves.

The recording unit includes two delay lines $E_1$ and $E_2$, each being, for example, of a length such that a square wave $e$ takes 80 ns. to cover the entire delay line $E_1$ or $E_2$, that is the delay time of each such delay line is 80 ns.

A distribution unit F is disposed between the shaping unit D and the delay lines $E_1$ and $E_2$ and it has an input $f$ connected to the output $g$ of the shaping unit D to receive the square waves $e$ therefrom and two outputs $h_1$, $h_2$ each connected to the input $j_1$, $j_2$ of a delay $E_1$, $E_2$ and delivering the received square waves to each delay line alternately during the delay time thereof, i.e. 80 ns.

Figure 4:
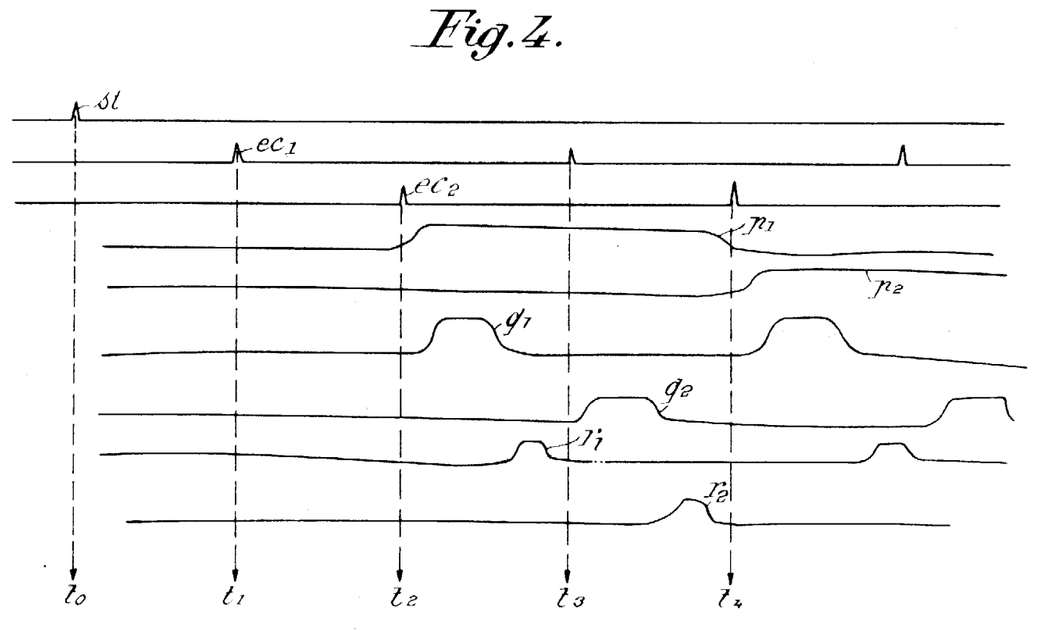

Referring to FIGURES 3 and 4, the time of arrival of the start pulse $st$ to the input $b$ will be referred to as the time $t_0$, and this pulse controls the starting of a clock G which starts the distribution unit F via its input $f_0$ so that the square waves $e$ are applied to the delay line $E_1$ during the first 80 nanoseconds.

At time $t_1$, 80 ns. after the time $t_0$, the distribution unit F ceases to distribute the square waves $e$ to the delay line $E_1$ and instead it distributes them to the delay line $E_2$ at the time $t_2$, 80 ns. after the time $t_1$. At the time $t_1$, all the pulses $d$ separated by more than 10 ns. and occurring less than 80 ns. after the start signal flow in the delay line $E_1$ in the form of square waves $e$ and similarly the pulses $d$ spaced less than 10 ns. and occurring more than 80 ns. and less than 160 ns. after the start flow in the delay line $E_2$ in the form of square waves $e$.

The recording unit also comprises sampling means (consisting of 16 outputs $k_1$ to $k_{16}$ in the case of line $E_1$; 16 outputs $k_{17}$ to $k_{32}$ in the case of line $E_2$; and transmission gates $Q_1$ to $Q_{16}$ and $Q_{17}$ to $Q_{32}$). The sampling means detect the state of each of the delay lines at intervals of substantially 5 ns. and, in combination with the sampling means, the recording unit comprises storage elements, i.e. two times sixteen trigger circuits $H_1$ to $H_{32}$ each connected to one of the two times sixteen outputs $k_1$ to $k_{32}$ (via the gates $Q_1$ to $Q_{32}$), adapted each to store the state of the associated delay line at a specified sampling time.

It will be seen that sampling is carried out on each delay line every 5 ns., while a pulse is required to be recorded only every 10 ns.

This sampling at double the speed is intended to allow handling of all the pulses occurring at a spacing greater than 10 ns. at the input $a$.

Referring to FIGURE 3, a pulse $d$ is converted to a square wave $e$ which is sampled at each marked time $x$, i.e. every 5 ns. The first square wave occurring substantially 15 ns. after the start $st$ is sampled once at this time $t_{15}$ while the other square waves $e$ are sampled at two successive times and correspond to two recordings $x$. In these conditions each pulse $d$ is provisionally stored either in just one trigger circuit H or in two adjacent trigger circuits H.

To eliminate the need for storage on the second trigger circuit H, if two consecutive trigger circuits have recorded the presence of one pulse $d$, the record unit comprises a logic circuit J consisting of comparator elements adapted to compare two successive storage elements H and deliver a square wave presence signal denoting the presence of the pulse $d$, whenever the first storage element or trigger circuit H of two successive elements stores a state corresponding to the existence of a square wave at the corresponding sampling time and is immediately preceded by an even number (possibly zero) of elements storing such a state.

If three triger circuits have recorded a pulse presence, only the state of the first and third trigger circuits will remain, and this corresponds to two physical pulses occurring at an interval of between 10 and 15 nanoseconds (i.e. as illustrated by the last two pulses $d$ in FIGURE 3).

These comparator means comprise, a first logic unit comprising 32 "AND" gates $K_1$ to $K_{32}$, each "AND" gate receiving at its first input $l_1$ the output of the associated trigger circuit (having the same index) while its second input $l_2$ receives the output of the preceding "AND" gate (of the index $n-1$ for the gate of the index $n$ when $n$ is different from 1 and index 32 in the case of a gate whose index $n$ is equal to 1) after inversion in an inversion element $L_1$ to $L_{32}$. With this circuit arrangement, the outputs of each gate $K_1$ to $K_{32}$ are fed if the corresponding trigger circuit $H_1$ to $H_{32}$ stores a pulse, without the preceding trigger circuit $H_{32}$ to $H_{31}$ storing a pulse. The comparator elements also comprise a second logic unit consisting of 16 "OR" gates $M_1$, $M_3$, $M_5$ . . . $M_{29}$ and $M_{31}$, each with two inputs connected one to an "AND" gate K having the same index and the other to the next "AND" gate K; thus the output of each gate M yields a voltage step if a pulse $d$ has occurred in the corresponding 10 ns. slot during the first 160 nanoseconds.

The last three lines in FIGURE 3 show the states of the trigger circuits H, the states of the outputs of the gates K and the state of the outputs of the gates M respectively.

The recording unit also comprises transfer means consisting of two sets of eight gates $N_1$ to $N_8$ and $N_9$ to $N_{16}$ which, when the corresponding control input $m_1$, $m_2$ is excited, are adapted to transfer the contents of the storage elements, after logic treatment in the comparator element unit $j$, to the buffer store. Buffer store B has a plurality of recording points, the successive points of this memory corresponding precisely to successive intervals of time of 10 ns.

The distribution unit P is adapted to distribute the outputs $n_1$ to $n_{16}$ of the transfer means $N_1$ to $N_{16}$ to successive groups of recording points of store B, more particularly to successive lines when the store is of the matrix type.

A control unit is provided to control—via the clock G—the distribution unit F, the storage elements or trigger circuits H (by means of gates $Q_1$ to $Q_{16}$ on the one hand, and $Q_{17}$ to $Q_{32}$ on the other hand, for sampling the outputs $k_1$ to $k_{16}$ and $k_{17}$ to $k_{32}$ respectively), and the transfer means $N_1$ to $N_{16}$ via the inputs $m_1$ and $m_2$ by means of a "column" current generator R for the matrix store B. This is provided so that for each delay line, the following occur cyclically in succession: square waves $e$ are fed to said delay line, the said delay line is sampled by the means $k$ and Q, storage is effected in the storage elements H associated with said delay line, the contents are transferred to the buffer store B by the transfer means $N_1$ to $N_{16}$ and the storage elements associated with this delay line are rezeroed (by means not shown); secondly, the control unit acts on the distribution unit P by means of a "line" current generator S so that the outputs of the transfer means $N_1$ to $N_{16}$ are fed to a new group of points of the buffer store B on each cycle of the delay lines, i.e. every 180 ns.

Referring now more particularly to FIGURES 3 and 4, the operation of the system shown in FIGURE 2 is as follows.

The square waves $e$ are fed to the delay line $E_1$ between the times $t_0$ and $t_1$. At the time $t_1$ all these square waves are at different places in the line $E_1$ which is then tested by opening of the gates $Q_1$ to $Q_{16}$ by the sampling signal $ec_1$ applied at $f_1$. The different square waves $e$ present during the 80 ns. of the time $t_0-t_1$ are temporarily recorded after $t_1$ in the storage elements or trigger circuits $H_1$ to $H_{16}$, thus the four square waves $e$ in FIGURE 3 are recorded in $H_3$, $H_6$ and $H_7$, $H_{12}$ and $H_{13}$, $H_{14}$ and $H_{15}$. These seven trigger circuits having temporarily recorded a pulse (the recording is shown as a "1" on the third line from the bottom in FIGURE 3), then feed the first input $l_1$ of the gates $K_3$, $K_6$, $K_7$, $K_{12}$, $K_{13}$, $K_{14}$, $K_{15}$. The input $l_2$ of $K_3$, $K_6$, $K_{12}$ and $K_{14}$ is fed when there is no input to $K_7$, $K_{13}$ and $K_{15}$. The "1" on the second line from the bottom of FIGURE 3 denotes the fed outputs of the gates K. Finally, of the gates M, those which occupy the second $(M_3)$, third $(M_5)$, sixth $(M_{11})$ and seventh $(M_{13})$ orders are fed.

During this time $t_1-t_2$, during which the square waves $e$ of the time $t_0-t_1$ are temporarily recorded in the trigger circuits $H_1$ to $H_{16}$, the square waves $e$ occurring at the input $f$ of the distribution unit F are transmitted to the delay line $E_2$. These square waves $e$ of the time $t_1-t_2$ tested by the sampling signal $ec_2$ applied to $f_2$ at the time $t_2$ and recorded in the storage elements $H_{17}$ to $H_{32}$ and then transferred to the outputs of the gates $M_{17}$ to $M_{31}$ in the same way as explained hereinbefore in connection with the square waves $e$ distributed to the delay line $E_1$ during the time $t_0-t_1$.

The cycle thus continues with the transmission of the square waves $e$ alternately to the delay line $E_1$ (time $t_2$ to $t_3$) and $E_2$ (time $t_3$ to $t_4$) with recording in the storage elements trigger circuits $H_1$ to $H_{16}$ after the time $t_3$ and $H_{17}$ to $H_{32}$ after the time $t_4$.

The following is the procedure for transferring the recordings from the storage elements $H_1-H_{32}$ to the buffer store:

During the time $t_2-t_4$, a line control current $p_1$ is applied to the unit S to record in the first line of the store B and a current $g_1$ limited to the time $t_2-t_3$ is applied to the unit R to feed the input $m_1$ of the gates $N_1$ to $N_8$, for transfer of the output of $M_1$ to $M_{15}$ in the eight points of the left-hand half of the first line of the store B, while during the time $t_3-t_4$ the clock G controls the application of a column current $q_2$ to the unit R to feed the input $m_2$ of the gates $N_9$ to $N_{16}$ thus transferring the output of the gates $M_{17}$ to $M_{31}$ to the points of the right-hand half of the first line of the store B. In the second parts of the times $t_2-t_3$ on the one hand and $t_3-t_4$ on the other hand the erase of rezeroing currents $r_1$ and $r_2$ are applied to the trigger circuits $H_1$ to $H_{16}$ on the one hand and $H_{17}$ to $H_{32}$ on the other.

After the time $t_4$, the cycle recommences with the application of a current $p_2$ from the unit P to record in, the second line of the store B.

It will therefore be apparent that recording of the pulses $d$ occurring in the 160 ns. slot occurs by alternate application of the square waves $e$ to the delay lines $E_1$ and $E_2$. The square waves are transmitted to $E_2$ the recording of the square waves of $E_1$ in the trigger circuits $H_1$ to $H_{16}$, the selection by the logic circuit J, and then the transmission by the gates $N_1$ to $N_8$ in the eight left-hand points of the selected line of the store B takes place, and then the corresponding operation occurs for the square waves $e$ in the delay line $E_2$.

As indicated hereinbefore, the buffer store B is preferably of the matrix type. It advantageously consists of a magnetically oriented Permalloy thin film applied to a glass plate. Three series of leads are disposed on the thin film, i.e., the write-in leads for the lines, write-in leads for the columns and read-out leads. These lines are of low impedance and high inductance. The electrical marker pulses from units N and P (FIGURE 2) must have specific values (for example of 50 ma. for the lines and 200 ma. for the columns). Where a line and a column current simultaneously meet, these currents produce crossed fields, the sum of which changes the state of the magnetic moments of a small zone of the Permalloy situated around the point of intersection.

Recording occurs at a point $B_{\mu,V}$ of B when there is a current both on the line $_\mu$ and the column V; this means that a pulse $d$ has occurred at a time a number of ns. after the time $t_0$ equal to: 160 $(_\mu-1)+10(V-1)+_\tau$, $\tau$ being the inaccuracy in the time and being less than 10 ns.

By way of example, FIGURE 1 shows a store B containing 64 lines (the end lines being marked 1 and 64) and sixteen columns (the end columns being marked 1 and 16). The memory then contains $64 \times 16=1024$ separate recording points corresponding to a time interval of $1024 \times 10=10240$ ns.

Reading of the magnetic store B is carried out by the application of currents to the read-out lines 1–64 (FIGURE 1) to cause the marked points to return to their original state, the marked points denoting those which have received a recording. On each change of state a pulse is collected on the corresponding column 1 to 16.

Of course, reading occurs only after the end of the recording of the information, i.e., at least 10240 ns., approximately 11 microseconds, after the start signal. The reading system C will interrogate the 1024 points of the memory B, line-by-line, to apply them to a multichannel selector connected at $c$. This selector may, for example, be of the type BM 96 of the Society Intertechnique (in which case it contains 4096 channels). Since the maximum speed of recording in this selector is 16 microseconds per unit of information, stepwise reading is required, this being carried out line-by-line as indicated hereinbefore and point-by-point in each line.

Figure 5:
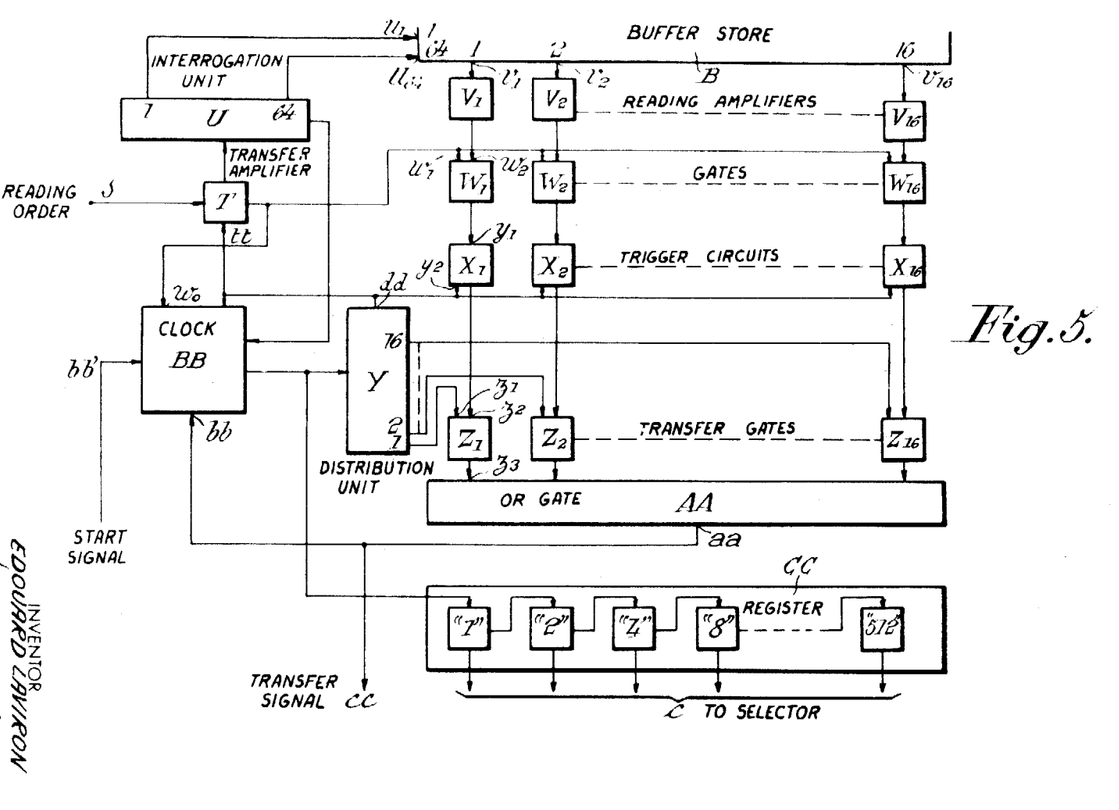
FIGURE 5 shows the various components of read-out means for the buffer store of the recorder apparatus shown in FIGURE 1.

FIGURE 5 illustrates a preferred embodiment of a reading device. In order that any recorded points of a number of points distributed as a matrix in lines and columns in the memory B may be read successively line-by-line, such a device comprises in combination:

means for simultaneous interrogation of the points of a given line, said means consisting of a unit U adapted to successively apply a reading current to the reading leads successively in accordance with the lines 1 to 64, i.e., to the inputs $u_1$ to $u_{64}$ of the store B;

a column reading unit comprising amplifiers $V_1-V_{16}$ connected to the read-out outputs $v_1$ to $v_{16}$ of the store B, said unit being adapted to transfer a reading pulse if the point of the said column "1" to "16" belonging to the line 1–64 interrogated has undergone a recording, i.e., if the point is a marked point;

a storage element for each column consisting, for example, of a trigger circuit $X_1$ to $X_{16}$ for storing any output pulse of the said column reading unit;

a transfer gate $Z_1$ to $Z_{16}$ for each column, such gate being adapted to transfer the contents of the said storage elements or trigger circuit $X_1$ to $X_{16}$;

a mixer or "OR" gate AA receiving the outputs of the transfer gate $Z_1$ to $Z_{16}$ to deliver a pulse at its output $aa$ whenever one of its inputs is fed;

a register CC consisting, for example, of cascade-connected trigger circuits of successive orders 1, 2, 4, 8 . . . 512, each trigger circuit feeding an output $c$ when it passes from its first inoperative state to its second energised state;

a clock BB adapted to apply pulses at a regular rate, for example every microsecond, to the register CC and cyclically at the same rate to the gates $Z_1$ to $Z_{16}$ via a distribution unit Y successively feeding the pulses arriving from the clock to the trigger inputs $z_1$ of the gates $Z_1$ to $Z_{16}$ so that these gates may be rendered successively operative, the information inputs $z_2$ of the gates being connected to the storage elements $X_1$ to $X_{16}$, each gate $Z_1$ to $Z_{16}$ delivering at its output $z_3$ when its control input $z_1$ is fed and when the associated storage element connected to its information input $z_2$ temporarily stores a reading pulse of the store B;

a control unit which when it has been triggered by a reading order at point $s$ is adapted to control the starting of the clock BB by its input $w_0$ and cyclic actuation of the line-by-line interrogation means by acting on the unit U via a "line" transfer amplifier T which successively applies transfer pulses to the actuation inputs $w_1$ of the gates $W_1$ to $W_{16}$ provided between the reading amplifiers $V_1$ to $V_{16}$ and the storage elements $X_1$ to $X_{16}$ in order to record any reading pulses in the said storage elements; and control means which are adapted firstly, in response to a supply to the output $aa$ of the mixer, to stop the clock BB by acting on its input $bb$ and control the recording, in the channel selector connected at $c$, of the number recorded in the register CC at the time the clock BB stops, and secondly to control the starting of the clock BB by its input $bb'$ in response to the end of transfer pulse.

The operation of the complete device shown in FIGURE 5 is as follows:

The application of a control pulse at $s$ opens the "line" transfer amplifier T. This amplifier feeds a pulse to unit U which will select the lines 1 to 64 of the store B successively by feeding the reading leads.

First of all, input $u_1$ is fed and for each marked point of the store B on the first line the corresponding output $v$ is fed and the same applies to the information input $w_2$ of the corresponding trigger circuit W. With a certain time shift in a delay unit (not shown), the "line" transfer amplifier T opens the "AND" gates $W_1$ to $W_{16}$ by their input $w_1$ and starts the clock BB by its input $w_0$. From this fact, zero, one, or more trigger circuits $X_1$ to $X_{16}$ are fed depending upon the number of marked points on the first line. When the sixteen trigger circuits $X_1$ to $X_{16}$ store the state of the points of the first line of the store B which correspond to them, the clock BB starts to feed pulses to the register CC at a given repetition frequency, for example 1 mc./s. These pulses are also applied to the unit Y which feeds them successively to the control input $z_1$ of the successive gates $Z_1$, $Z_2$ . . . $Z_{16}$. The first clock pulse BB therefore tests the first trigger circuit $X_1$, the second pulse BB tests the second trigger circuit $X_2$ and so on. The output $aa$ of the "OR" gate AA is fed as soon as a Y pulse opens a gate Z corresponding to a trigger circuit X which has stored a marked point of the store B. At that time the output pulse of $aa$ is fed to the input $bb$ of the clock BB to stop it. The trigger circuits of register CC at that time record the sequence number of the trigger circuit X which stored a marked point. By way of $cc$ the supply from output $aa$ also controls the transfer of the recorded number in the register CC to the slow selector connected at $c$. The end-of-transfer pulse applied at $bb'$ restarts the clock BB which tests the next trigger circuit X and so on until the clock BB is again stopped when a new trigger circuit X storing a marked point is found. It will thus be seen that the sequence number of the various trigger circuits which have recorded a marked point on the first line is transferred successively in the slow selector connected at $c$.

After testing of the 16th trigger circuit $X_{16}$, the clock BB stops again as it receives an output pulse $dd$ from Y which is also applied to the rezeroing inputs $y_2$ of the trigger circuits X and to the input $tt$ of the unit T. This enables the unit U to feed the next line (second line) of the store B and the cycle restarts. The register CC displays "16" at the start of the new cycle. The point of the first column and of the second line which will then be tested will correspond to the number "17" of the register CC.

The total cycle time is given by the following calculations:

1$\mu$s per memory point, i.e. 1024$\mu$s.
10$\mu$s per memory line, i.e. 640 $\mu$s.
16$\mu$s per recorded information, i.e. 16N$\mu$s.
(N being the total number of recorded informations)

As indicated hereinbefore, the recording of the information takes about 11$\mu$s. and about 10$\mu$s. must be allowed between the arrival of the last codable pulse in the store B and read-out. A complete cycle therefore lasts about $1.7+0.016$ N in ms.

Finally, as indicated in FIGURE 1, a simulation unit $D_0$ is advantageously provided for checking proper operation of the complete apparatus.

The simulator allows three checking operation as follows:

(a) Checking of the 1024 points of the store, i.e., immediately after the starting pulse the simulator feeds a train of 1024 pulses at a repetition frequency of 100 m./cs. and therefore a recording on the 1024 store points should be found at the output;

(b) Checking of input circuit: the simulator applies a pulse phase-shifted by a time T after the start; the phase shift ranges between 0 and 10.24µs. and is produced continuously; if any doubt exists concerning a given store point, the pulse can be delayed by a time corresponding to the store point and be varied ±5 ns. about this delay;

(c) Physical check on operation: this check is the one which is closest to actual operation; the pulses delivered by a white-noise generator are fed at a frequency of 100 c.p.s. for 10.24µs. to the time expander; the white-noise generator is so designed that it never delivers more than 500 pulses in 10µs.; moreover, at the end of a given time a constant spectrum must be obtained on the selector.

Any of the above embodiments provides an electrical pulse time selector, analyser or recorder, the operation of which is sufficiently clear from the foregoing for there to be no further need of explanation, and as compared with prior art devices of the type in question the invention has numerous advantages, inter alia as follows:

All pulses occurring at intervals of greater than 10 ns. can be handled provided of course that the shaping unit D can operate at a repetition frequency of 100 mc./s.

No pulse is recorded twice.

The device according to the invention is in fact a time expander which allows the handling of pulses following one another at a high repetition frequency (of the order of 100 mc./s.), their storage and subsequent restoration, with indication of their arrival time, in a relatively slow selector having 1024 channels or more.

It can operate to record bursts of pulses following one another at a repetition frequency of up to 150 c./s. or more; in cases where said frequency is 150 c./s., up to 310 pulses can be recorded in a cycle of 6.66 ms. (a complete cycle lasting 1.7+0.016 N ms.).

Its operation is reliable and requires only reduced power consumption.

I claim:

1. Apparatus for the recordal of electrical pulses separated by an interval of time greater than an interval $i$, such apparatus comprising: an input terminal to which input pulses to be recorded are applied; a shaping unit connected to said input terminal for producing from each input pulse an electrical square wave signal of width between $i/2$ and $i$; a first distribution unit connected to receive the square wave signals produced by said shaping unit; a plurality of output terminals for the first distribution unit to which the square wave signals are applied cyclically by said first distribution unit; a plurality of delay lines each of which is connected to a respective one of said output terminals; said first distribution unit applying the square wave signals to each output terminal for a period substantially equal to the delay times of the respective delay line connected to such output terminal; sampling and discriminating means for sampling the square wave signals in each delay line in turn at locations therealong, the locations being so spaced apart that a square wave signal takes a time $i/2$ to pass between two adjacent locations, and for transmitting a pulse presence signal for each square wave signal detected in the delay line sampled; a buffer store connected to said sampling and discriminating means for recording the pulse presence signals, such buffer store including groups of recording points each group comprising a plurality of recording points corresponding to successive intervals of time substantially equal to $i$; a second distribution unit to distribute the pulse presence signals from said sampling and discriminating means to the points of said buffer store so as to reflect the time relationships between the input pulses corresponding to such pulse presence signals; and control means connected to control the operation of said first distribution unit, the sampling and discriminating means and said second distribution unit.

2. Apparatus as claimed in claim 1 in which said sampling and discriminating means comprises: sampling means connected to said delay lines for detecting the presence of square wave signals in each delay line in turn at locations therealong spaced apart a distance travelled by a square wave signal in an internal $i/2$; storage elements, each of which corresponds to a location along a delay line, connected to said sampling means for receiving and storing sampling information obtained at the locations of the delay line by said sampling means during a sampling operation; comparator means connected to compare the information stored by pairs of successive storage elements and for transmitting a pulse presence signal whenever a first storage element of a pair of storage elements stores information corresponding to the presence of a square wave at the corresponding sampling location and is immediately preceded by an even number of, or zero, elements storing similar information; and transfer means for transferring the pulse presence signals from said comparator means to said buffer store; said second distribution unit acting to distribute the pulse presence signals transferred by said transfer means to successive groups of recording points of said buffer store for successive sampling operations.

3. Apparatus as claimed in claim 2 in which: said buffer store is a matrix store comprising recording points distributed as a matrix in lines and columns; said transfer means is provided with a control terminal; and said control means includes a column current generator for applying a control signal to the control terminal of the transfer means to effect transfer of pulse presence signals to the columns of the matrix and a line current generator connected to said second distribution unit whereby pulse presence signals are recorded on a new line of the matrix store for each sampling operation.

4. Apparatus as claimed in claim 3 having read-out means for reading the successively recorded points of the matrix store line-by-line, such read-out means comprising: interrogating means for applying an interrogating signal to the points of a line of the matrix store simultaneously; column reading means for each column of the matrix store, such reading means transmitting a reading pulse if the point of the column belonging to the interrogated line has undergone a recording operation; a column storage element connected to each column reading means for receiving and storing any reading pulse from such column reading means; a reading transfer gate connected to each column storage element; a mixer having a plurality of input terminals connected to respective ones of said reading transfer gates; an output of said mixer at which said mixer delivers an output pulse whenever one of its inputs is fed by a reading pulse from its respective reading transfer gate; a register; a clock; said clock being connected to apply pulses at a regular rate to said register and cyclically to said reading transfer gates to render them operative; a control unit; trigger means for said control unit; said control unit being connected to control on being triggered the starting of said clock, the actuation of the line-by-line interrogating means and the transfer of the reading pulses by said reading gates; a control means connected to said mixer output; and a channel selector; said control means responding to an output signal at the output of said mixer to stop the clock and control the recording in said channel selector of the pulse recorded in the register at the time when the clock stops.

5. Apparatus as claimed in claim 3 in which: said sampling means comprises a plurality of sampling outputs for each delay line, each such sampling output being disposed at a sampling location, and a set of sampling gates for each delay line, each gate of a set being connected to a corresponding sampling output of the respective delay line; said storage elements are trigger circuits; one such trigger circuit being connected to each sampling gate, and said comparator means comprises a plurality of "AND" gates, a first input for each "AND" gate, such first input being connected to a corresponding one of the trigger circuits, a second input for each "AND" gate connected to the preceding "AND" gate, an inversion element for each "AND" gate connected to the second input for inverting a signal applied to the second input, a plurality of "OR" gates and first and second inputs for each "OR" gate connecting such "OR" gate to a corresponding pair of "AND" gates.

6. Apparatus as claimed in claim 5 in which said transfer means comprises a set of transfer gates for each delay line, each transfer gate being connected to a respective one of the "OR" gates; and a control terminal for each set of transfer gates whereby a control signal from said control means effects transfer of pulse presence signals to the buffer store.

7. Apparatus as claimed in claim 5 in which the first distribution unit has a control terminal, and said control means includes a clock applying a signal to the control terminal of said first distribution unit to begin feeding of square wave signals to one of the delay lines.

8. Apparatus as claimed in claim 5 including two delay lines each having a delay time of 80 ns., the sampling outputs distributed along each delay line being spaced a distance travelled by a square wave signal in 5 ns.

References Cited

UNITED STATES PATENTS

| | | | |
|---|---|---|---|
| 3,257,645 | 6/1966 | Lekven | 340—172.5 |
| 3,288,928 | 11/1966 | Bartlett et al. | 178—50 |
| 3,293,613 | 12/1966 | Gabor | 340—172.5 |
| 3,312,945 | 4/1967 | Berezin et al. | 340—172.5 |
| 3,333,250 | 7/1967 | Hill et al. | 340—172.5 |

PAUL J. HENON, *Primary Examiner.*

JOHN P. VANDENBURG, *Assistant Examiner.*